(12) United States Patent
Pou

(10) Patent No.: US 6,188,423 B1
(45) Date of Patent: Feb. 13, 2001

(54) EARLY THERMAL PRINTHEAD FAILURE PREDICTION SYSTEM

(75) Inventor: Frederick M. Pou, Bellbrook, OH (US)

(73) Assignee: Monarch Marking Systems, Inc., Dayton, OH (US)

( * ) Notice: Under 35 U.S.C. 154(b), the term of this patent shall be extended for 0 days.

(21) Appl. No.: 09/435,969

(22) Filed: Nov. 8, 1999

Related U.S. Application Data

(63) Continuation-in-part of application No. 08/929,852, filed on Sep. 15, 1997, now abandoned.

(51) Int. Cl.⁷ ................................. B41J 2/35; B41J 2/355
(52) U.S. Cl. ............................................ 347/211; 347/171
(58) Field of Search .................................... 347/171, 211; 400/120.01, 54; 324/525

(56) References Cited

U.S. PATENT DOCUMENTS

| | | | |
|---|---|---|---|
| 4,595,935 | * | 6/1986 | Brooks et al. . |
| 4,769,657 | * | 9/1988 | Takahashi ............................ 337/171 |
| 4,774,526 | * | 9/1988 | Ito ........................................ 347/171 |
| 4,996,487 | * | 2/1991 | McSparran et al. ................. 324/549 |

* cited by examiner

Primary Examiner—Huan Tran
(74) Attorney, Agent, or Firm—McAndrews, Held & Malloy, Ltd.

(57) ABSTRACT

A thermal printer early printhead failure prediction system detects possible printhead and/or printing element failure in response to the sensed resistance of the printhead or an individual element thereof. A microprocessor of the printer monitors the resistive trends of the printing elements. A warning is generated when a characteristic of the resistive trend exceeds a predetermined boundary.

31 Claims, 2 Drawing Sheets

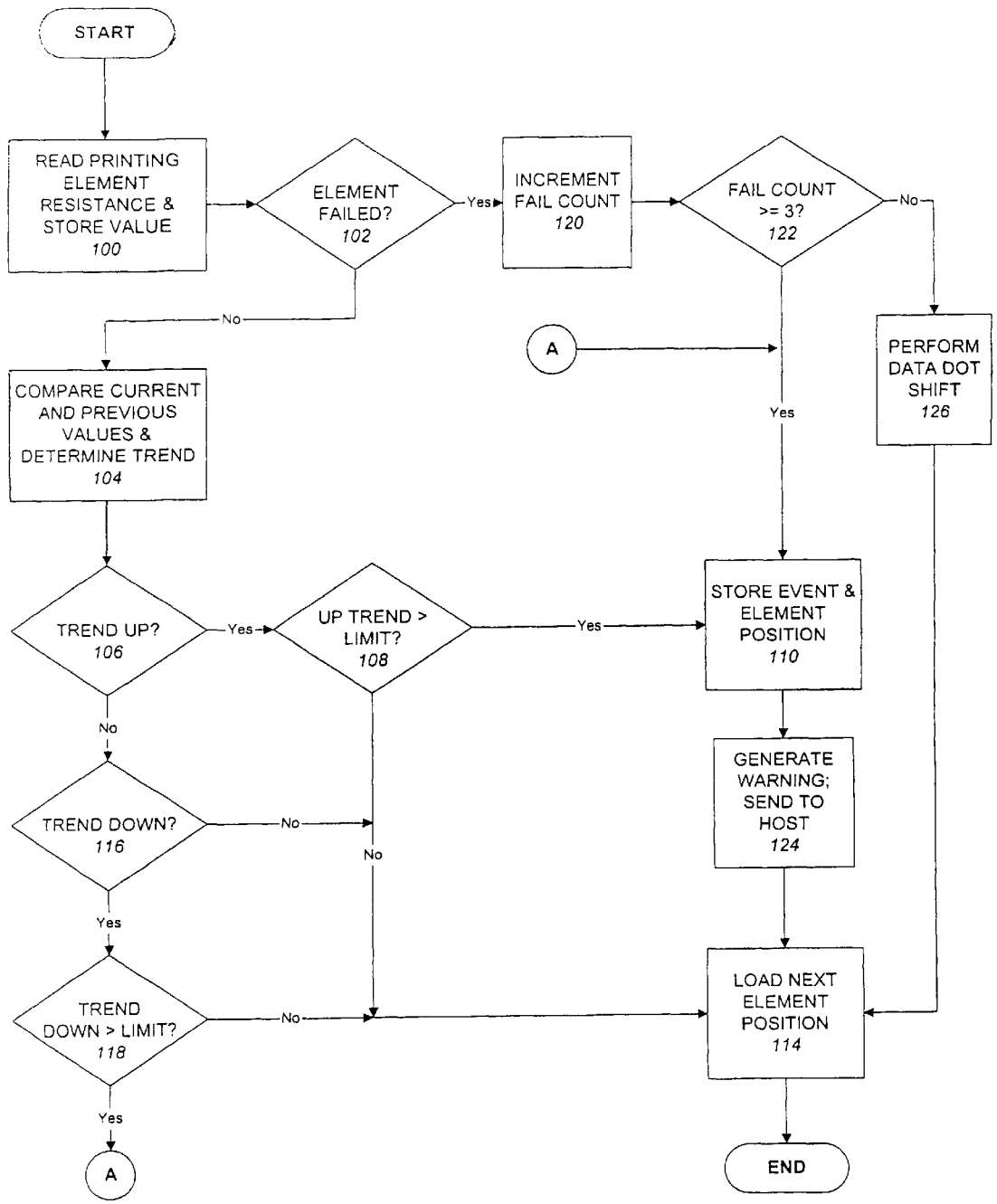

EARLY THERMAL PRINTHEAD FAILURE PREDICTION SYSTEM

CROSS-REFERENCE TO RELATED APPLICATIONS

This is a continuation-in-part of U.S. patent application Ser. No. 08/929,852 filed Sep. 15, 1997, now abanbonded.

STATEMENT REGARDING FEDERALLY SPONSORED RESEARCH OR DEVELOPMENT

N/A

TECHNICAL FIELD

The present invention is directed to a thermal printer for printing tags and/or labels and more particularly to such a printer and method for predicting thermal printhead failure.

BACKGROUND OF THE INVENTION

Known thermal label/tag printers include thermal printheads containing individual printing elements. When a printing element fails, it may result in a discontinuity in the printing. Prior thermal label printers have used data dot shift routines to shift data around a failed printing element so that the failed printing element is aligned with "zero" print data. This feature extends the useful life of a thermal printhead. However, such routines do not provide any warning as to when a printing element is failing.

BRIEF SUMMARY OF THE INVENTION

The early thermal printhead failure prediction system of the present invention is directed to overcome the limitations of the prior data dot shift routines described above. The early thermal printhead failure prediction system of the present invention monitors the resistive trends of the individual printing elements of a thermal printhead to provide a warning indication when the resistive trends deviate beyond predetermined limits.

More particularly, in accordance with the present invention, a microprocessor monitors the resistive trends of the printing elements of the thermal printhead. A read/write memory is used to store previously determined resistive values of the individual printing elements sampled over time for use in determining the resistive trend. Specifically, the microprocessor compares a current resistance value determined for a particular printing element to one or more previously determined resistance values for that particular printing element including the resistance value determined immediately preceding the current value to determine the trend in the resistance for that printing element. The microprocessor compares one or more characteristics of the resistive trend to predict whether an individual printing element is failing. If the microprocessor determines that an individual printing element may be failing, a warning to that effect is generated.

When the microprocessor of a thermal label/tag printer executes such a printhead failure prediction routine, maintenance may be scheduled before the thermal printhead fails and/or data dot shift routines become ineffective.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 2 is a flow chart illustrating a thermal printhead failure prediction routine of the thermal label/tag printer of FIG. 1.

DETAILED DESCRIPTION OF THE INVENTION

Figure 1:
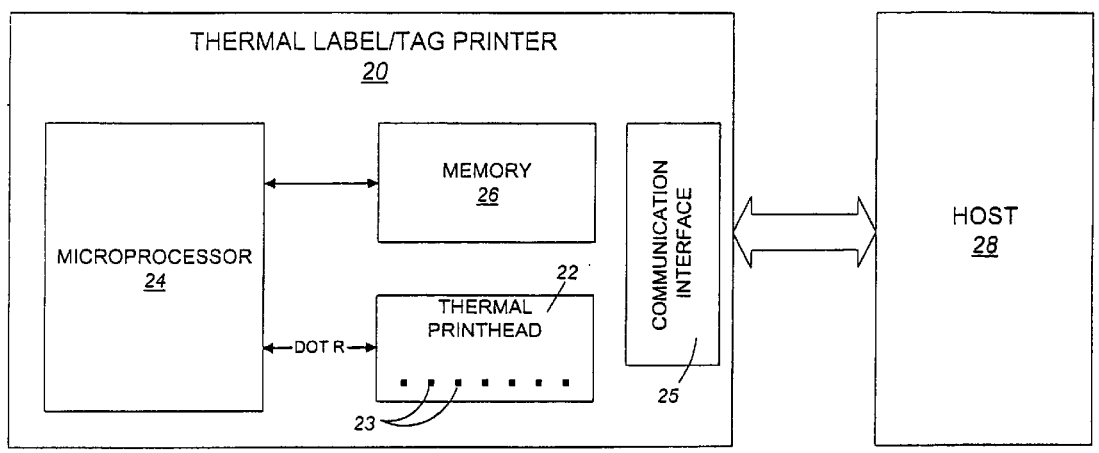
FIG. 1 is a block diagram of a thermal label/tag printer of the present invention in communication with a host.

A thermal label/tag printer 20 in accordance with the present invention, as shown in FIG. 1, includes a thermal printhead 22 for printing barcode and/or alpha-numeric data on a web of record members such as tags and labels. A microprocessor 24 controls the operation of the thermal printhead 22, which includes a plurality of printing elements 23, alternately referred to as dot elements. Specifically, the microprocessor 24 controls the printhead 22 to print data received from the host 28 and/or other input devices, not shown, such as a keyboard, barcode scanner, etc., in accordance with software stored in the memory 26. The memory 26 may include ROM and/or RAM, and/or a flash type memory, etc. The microprocessor 24 also monitors the condition of the thermal printhead to determine whether one or more printing elements 23 are likely to fail soon as discussed in detail below.

The thermal label/tag printer 20 communicates with the host computer 28 via a communication interface 25 which may take the form of a hard-wired interface, such as a RS 232 interface, or a wireless interface, such as a radio frequency (RF) or infrared (IR) interface.

The microprocessor 24 executes the thermal printhead failure prediction routine, depicted in FIG. 2, to predict whether an individual printing element of the thermal printhead is failing. The routine is preferably executed to monitor each of the printing elements 23 of the printhead 22 by looping through the routine until all of the printing elements 23 are checked. Alternatively, it may be executed a single time to predict whether one printing element is failing, or it may be executed several times to test a subset of the printing elements 23 of the thermal printhead 22.

The first time that the routine is executed, the first printing element position is loaded prior to execution of the routine as depicted in FIG. 2. Alternately, if it is desired to only test a single printing element, that element position is loaded prior to execution. If it is desired to test a subset of the printing elements 23, the position of the first printing element of the subset is loaded prior to execution. The microprocessor 24 then begins the failure prediction routine by evaluating the loaded printing element or dot element of the thermal printhead 22. Specifically, the microprocessor 24 determines the current resistance value of the printing element at block 100 and stores this value in the memory 26 for later use. At block 102, the microprocessor 24 determines whether the resistance of the printing element indicates that it has failed. If the microprocessor 24 determines at block 102 that the printing element has not yet failed, the microprocessor 24 proceeds to block 104 where it compares a resistance value or values previously determined and stored at block 100 for that printing element to the current resistance that was found at block 100 to determine a resistive trend. Preferably, the microprocessor 24 at block 104 compares the current resistance value to the resistance value determined at block 100 immediately preceding the current value for the particular printhead. Alternatively, the microprocessor can compare the current resistance values to a number of previously determined values for that element. If the microprocessor 24 determines at block 106 that the resistive trend of the printing element is increasing, the microprocessor 24 proceeds to block 108 to determine whether a characteristic of the increasing resistive trend has exceeded predetermined boundaries. This determination may be made by comparing the curve defined by the resistive trend for the printing element to a predetermined, previously stored curve to determine whether the printing element is approaching failure. The difference between the curve defined by the resistive trend and a predetermined curve can also be examined to determine whether the printing element is approaching failure. For example, the average value and/or the maximum value and/or the minimum value of the difference between the curves may be compared to predetermined values to determine whether the printing element is approaching failure. Alternatively, this determination may be made by comparing the slope or rate of change of the resistive trend for the printing element to a predetermined slope or rate of change. The current resistance value of the printing element may also be used as the characteristic of the trend where the resistance is compared to a reference value to determine whether it is greater than the reference indicating approaching failure of the element.

If a characteristic of the resistive trend exceeds the predetermined boundaries as determined at block 108, the microprocessor 24 predicts that the printing element is failing and proceeds to block 110. At block 110 the microprocessor 24 stores in memory the position of the printing element predicted to fail. The microprocessor 24 then proceeds to block 124 to generate a warning message that preferably includes the identity of the printing element approaching failure and/or its position. The warning message may be sent to a host computer 28 via a communication interface 25 in the thermal label/tag printer 20. Alternatively, a warning indication may be directly displayed to the user of the thermal label/tag printer 20. For example, a message may be displayed on a display of the thermal label/tag printer 20 or a warning LED o the thermal label/tag printer 20 may be illuminated. The next printing element position to be evaluated is then loaded by the microprocessor 24 in block 114. This allows all printing elements 23 of the thermal printhead 22 to be monitored when the routine is executed in a loop. If the routine is executing in a loop, the microprocessor 24 returns to block 100 to continue testing the remainder of the printing elements 23 of the thermal printhead 22.

If the microprocessor 24 determines in block 108 that the resistive trend does not exceed predetermined boundaries, the next printing element is loaded at block 114. If the routine is executing in a loop, the microprocessor 24 then returns to block 100.

If the microprocessor 24 determines in block 106 that the resistive trend is not increasing, the microprocessor 24 proceeds to block 116 where it evaluates whether the resistive trend is decreasing. If the resistive trend is not decreasing, the next printing element is loaded at block 114. If the routine is executing in a loop, the microprocessor 24 then returns to block 100.

If, however, the microprocessor 24 determines at block 116 that the resistive trend is decreasing, the microprocessor 24 then determines at block 118 whether a characteristic of the decreasing resistive trend has exceeded predetermined boundaries in a manner similar to that described with reference to block 108. If a characteristic of the resistive trend exceeds predetermined boundaries, the microprocessor 24 proceeds to block 110 and stores the position of the predicted failing printing element in memory 26. At block 110, the microprocessor 24 also stores selected characteristics of the resistive trend. The microprocessor 24 then proceeds to block 124 to generate a warning message indicating the printing element approaching failure and/or its position. The warning message may be sent to a host computer 28 via a communication interface 25 and/or a warning indication, such as a message on a display screen of the thermal label/tag printer 20 or an illuminated LED on the thermal label/tag printer 20, may be displayed. The next printing element position is then loaded by the microprocessor 24 at block 114. If the routine is executing in a loop, the microprocessor 24 returns to block 100 to continue testing the remainder of the printing elements 23 of the thermal printhead 22.

If the microprocessor 24 determines at block 118 that the downward resistive trend has not exceeded predefined boundaries, the microprocessor 24 proceeds from block 118 to block 114 and loads the position of the next printing element to be evaluated at block 114, thereafter returning to block 100 if the routine is executing in a loop.

If, at block 102, the microprocessor 24 determines that the loaded printing element has failed, the microprocessor 24 proceeds to block 120 where it increments a variable or register to indicate that it has detected another failed printing element. This variable or register may be stored in memory 26. The microprocessor 24 then proceeds to block 122 where it evaluates whether three or more failed printing elements 23 have been detected yet by checking the variable or register recording the number of failed printing elements 23. If three or more printing elements 23 in the thermal printhead 22 have failed, the microprocessor 24 proceeds to block 110 where the position of the failed printing element is stored in memory 26 along with an indication that the element has failed. The microprocessor 24 then proceeds to block 124 where a warning message is generated indicating that the thermal printhead 22 has failed. The warning message may be sent to a host computer 28 via a communication interface 25 and/or a warning indication may be directly displayed to the user of the thermal label/tag printer 20. The microprocessor 24 then loads the position of the next printing element to be evaluated at block 114. If the routine is executing in a loop, the microprocessor 24 returns thereafter to block 100.

In practice, it is known that data to be printed may be shifted around one or two failed printing elements 23 and still be printed with acceptable results. As a result, if fewer than three failed printing elements 23 are detected at block 122, the microprocessor 24 at block 126 performs a known data dot shift routine to shift data to be printed around the failed printing element. Thereafter the microprocessor 24 proceeds from block 126 to block 114 where the microprocessor 24 loads the position of the next printing element to be evaluated. If the routine is executing in a loop, the microprocessor 24 returns to block 100. After checking all of the printing elements to be monitored by the routine of FIG. 2, the microprocessor returns to a main routine, as will be apparent to one of ordinary skill wherein the main routine calls the routine of FIG. 2 to determine and store new resistance values for the printing element(s) so that the resistive trend can continue to be monitored.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. In a barcode printer, a system to predict thermal printhead failure comprising:

a thermal printhead including a plurality of printing elements, each printing element having an associated resistance value; and a processor for determining a plurality of resistance values for at least one of said printing elements and for comparing each determined resistance value to at least its immediately preceding determined resistance value for that printing element to determine a trend of the resistance of at least one of said printing elements, said processor generating a warning for indicating when a characteristic of the resistive trend deviates beyond a predetermined boundary.

2. The barcode printer as defined in claim 1, wherein said characteristic of said resistive trend exceeds a predetermined boundary when the rate of increase in the resistive trend exceeds a predetermined value.

3. The barcode printer as defined in claim 1, wherein said characteristic of said resistive trend exceeds a predetermined boundary when the rate of decrease in the resistive trend exceeds a predetermined value.

4. The barcode printer as defined in claim 1, wherein said characteristic of said resistive trend exceeds a predetermined boundary when the resistance of one of said printing elements drops below a predetermined value.

5. The barcode printer as defined in claim 1, wherein said characteristic of said resistive trend exceeds a predetermined boundary when the resistance of one of said printing elements exceeds a predetermined value.

6. The barcode printer as defined in claim 1, including a read/write memory for storing a position of a printing element when the characteristic of the resistive trend for the printing element exceeds said predetermined boundary.

7. The barcode printer as defined in claim 1, including a memory for storing one or more characteristics of said determined resistive trend.

8. The barcode printer as defined in claim 7, wherein one of said stored characteristics is the resistance of the printing element.

9. In a printer for printing on a web of record members, a system for detecting thermal printhead failure comprising:
   a thermal printhead including a plurality of printing elements each having an associated resistance;
   a processor for determining the resistance of a plurality of said printing elements over time to determine an associated resistive trend for each of said plurality of printing elements by comparing each resistance determined for a given printing element to its immediately preceding determined resistance for said given printing element, said processor determining whether the resistive trend of each printing element exceeds a predetermined limit; and
   a read/write memory for storing the position of a printing element determined to have a resistive trend that exceeds a predetermined limit.

10. The printer for printing on a web of record members as defined in claim 9, wherein said resistive trend exceeds said predetermined limit when the rate of increase in the resistive trend exceeds a predetermined value.

11. The printer for printing on a web of record members as defined in claim 9, wherein said resistive trend exceeds said predetermined limit when the rate of decrease in the resistive trend exceeds a predetermined value.

12. The printer for printing on a web of record members as defined in claim 9, wherein said resistive trend exceeds said predetermined limit when the resistance of one of said printing elements drops below a predetermined value.

13. The printer for printing on a web of record members as defined in claim 9, wherein said resistive trend exceeds said predetermined limit when the resistance of one of said printing elements surpasses a predetermined value.

14. The printer for printing on a web of record members as defined in claim 9, wherein said microprocessor determines whether said resistive trend of one of said printing elements exceeds said predetermined limit by comparing said resistive trend of one of said printing elements to a predetermined curve.

15. The printer for printing on a web of record members as defined in claim 9, wherein said resistive trend exceeds said predetermined limit when the average value of the difference between the curve defined by said resistive trend of one of said printing elements and a predetermined curve exceeds a predetermined value.

16. The label printer as recited in claim 9 further including a communication interface for transmitting a message to a host computer indicating the position of a printing element having a resistive trend that exceeds said predetermined limit.

17. A method of monitoring a thermal printer having a thermal printhead comprising a plurality of printing elements, a processing means, and a memory for storing data, comprising:
   determining a plurality of resistance values for at least one of said printing elements;
   storing said determined resistance values;
   comparing each of said resistance values determined for a print element to its immediately preceding determined resistance value for the print element to determine a trend;
   comparing a characteristic of said resistance trend to a reference;
   storing the printing element position in said memory when said characteristic of said resistance trend exceeds said reference; and
   generating a warning when said characteristic of said resistance trend exceeds said reference.

18. The method of monitoring a thermal printer as recited in claim 17 including the step of sending said warning to a host computer.

19. The method of monitoring a thermal printer as recited in claim 17 including the step of storing said second resistance value in said memory.

20. The method of monitoring a thermal printer as recited in claim 17 wherein said reference is a predetermined value stored in said memory.

21. The method of monitoring a thermal printer as recited in claim 17 wherein said reference represents a rate of change.

22. The method of monitoring a thermal printer as recited in claim 17 wherein said reference represents a curve.

23. The method of monitoring a thermal printer as recited in claim 17 wherein said reference represents an upper limit value.

24. The method of monitoring a thermal printer as recited in claim 17 wherein said reference represents a lower limit value.

25. A method of monitoring a label printer having a thermal printhead including a plurality of printing elements, a processing means, and a memory comprising:
   determining a plurality of resistance values for at least one of said printing elements;
   storing said determined resistance values;
   comparing each of said resistance values determined for a print element to its immediately preceding determined resistance value for the print element to determine a trend;
   determining if said resistance trend is increasing or decreasing;

comparing a characteristic of said resistance trend to a first reference when said resistance trend is increasing to determine if an upper limit is exceeded;

comparing a characteristic of said resistance trend to a second reference when said resistance trend is decreasing to determine if said characteristic falls below a lower limit; and generating a warning when either said upper limit is exceeded by said characteristic or said characteristic is below said lower limit.

26. The method of monitoring a label printer as recited in claim 25 wherein said characteristic is the rate of change of the resistance trend.

27. The method of monitoring a label printer as recited in claim 25 wherein said characteristic is a curve determined by said resistance trend.

28. The method of monitoring a label printer as recited in claim 25 wherein said characteristic is a resistance value.

29. The method of monitoring a label printer as recited in claim 25 further comprising the step of sending said warning to a host computer.

30. In a barcode printer, a system to predict thermal printhead failure comprising:

a thermal printhead including a plurality of printing elements, each printing element having an associated resistance value;

a memory for storing a plurality of resistance values for at least one of said printing elements;

a processor for determining a current resistance value for at least one of the printing elements and for comparing the determined current resistance value to the plurality of resistance values previously stored for the printing element to determine a trend of the resistance of at least one of said printing elements, said processor generating a warning for indicating when a characteristic of the resistive trend deviates beyond a predetermined boundary.

31. A method of monitoring a label printer having a thermal printhead including a plurality of printing elements, a processing means, and a memory comprising:

reading a first resistance value for one of said printing elements;

storing said first resistance value;

reading a second resistance value for the same of said printing elements;

comparing said first resistance value to said second resistance value to determine a resistance trend;

determining if said resistance trend is increasing or decreasing;

comparing a characteristic of said resistance trend to a first reference when said resistance trend is increasing to determine if an upper limit is exceeded;

comparing a characteristic of said resistance trend to a second reference when said resistance trend is decreasing to determine if said characteristic falls below a lower limit; and generating a warning when either said upper limit is exceeded by said characteristic or said characteristic is below said lower limit.

* * * * *